US006968569B2

(12) United States Patent
Tanaka et al.

(10) Patent No.: US 6,968,569 B2
(45) Date of Patent: Nov. 22, 2005

(54) DATA BROADCAST RECEIVING APPARATUS AND METHOD

(75) Inventors: Akihiro Tanaka, Moriguchi (JP); Naoya Takao, Kadoma (JP); Koichiro Yamaguchi, Ashiya (JP); Rikiya Masuda, Neyagawa (JP)

(73) Assignee: Matsushita Electric Industrial Co., Ltd., Osaka-fu (JP)

( * ) Notice: Subject to any disclaimer, the term of this patent is extended or adjusted under 35 U.S.C. 154(b) by 720 days.

(21) Appl. No.: 09/776,967

(22) Filed: Feb. 5, 2001

(65) Prior Publication Data

US 2001/0027122 A1    Oct. 4, 2001

(30) Foreign Application Priority Data

Feb. 7, 2000 (JP) .............................. 2000-029826

(51) Int. Cl.[7] .................. H04N 7/16; H04N 7/173; G06F 11/00; G06F 13/28
(52) U.S. Cl. .................. 725/135; 725/105; 725/143; 725/109; 714/54; 714/57; 711/126; 711/144
(58) Field of Search ................ 725/109–110, 134–136, 725/142, 87–90, 50, 54; 709/203, 217–219; 711/118, 126, 144; 714/45, 57, 54

(56) References Cited

U.S. PATENT DOCUMENTS 5,818,441 A * 10/1998 Throckmorton et al. .... 345/717

| 5,929,850 | A  | * | 7/1999  | Broadwin et al. | 725/110 |
|-----------|----|---|---------|-----------------|---------|
| 6,317,885 | B1 | * | 11/2001 | Fries           | 725/109 |
| 6,351,467 | B1 | * | 2/2002  | Dillon          | 370/432 |
| 6,571,392 | B1 | * | 5/2003  | Zigmond et al.  | 725/110 |
| 6,628,302 | B2 | * | 9/2003  | White et al.    | 345/717 |

FOREIGN PATENT DOCUMENTS

JP    10209892    8/1998

OTHER PUBLICATIONS

Bott, Ed; Special Edition Using Windows 95 with Internet Explorer 4.0, Feb. 17, 1998, Que, Chapters 18 and 19.*

* cited by examiner

Primary Examiner—John Miller
Assistant Examiner—Michael R Shannon

(57) ABSTRACT

A data broadcast receiving apparatus includes a storage controlling unit and a reproduction controlling unit. The storage controlling unit stores data modules among a plurality of data modules included in received broadcast data, into a module storing unit and also stores storage information for each of the plurality of data modules into a storage information storing unit, the storage information showing the presence or absence of the data module in the module storing unit, a reason of the absence of the data module, and the like. When the user selects a data module as a reproduction target, the reproduction controlling unit judges whether the data module is stored unit, based on storage information of the data module. If the data module is not stored, the reproduction controlling unit displays a message informing the user of the fact and reason that the data module is not stored.

14 Claims, 21 Drawing Sheets

FIG. 3

| ID | NAME | VERSION | TYPE | EXPIRY DATE |
|---|---|---|---|---|
| 0 | TOP_MN | 13 | JPEG | — |
| 100 | CH1_MN | 8 | JPEG | — |
| 101 | NEW_12 | 8 | TXT | — |
| ⋮ | | | | |
| 200 | CH2_MN | 7 | JPEG | 2000/01/14 |
| ⋮ | | | | |
| 210 | KIN_WT | 8 | MIX | 2000/01/14 |
| 220 | KAN_WT | 8 | MIX | 2000/01/14 |
| ⋮ | | | | |
| 300 | CH3_MN | 6 | JPEG | — |
| 330 | CD_MN | 15 | JPEG | 2000/01/10 |
| 340 | BGM_MN | 11 | LIC | — |
| ⋮ | | | | |

FIG. 6

STORAGE INFORMATION STORING UNIT 140

| ID | NAME | VERSION | TYPE | EXPIRY DATE | STORAGE STATE | PROBLEM ID | SOLUTION ID |
|---|---|---|---|---|---|---|---|
| 0 | TOP_MN | 13 | JPEG | — | STORED | — | — |
| 100 | CH1_MN | 8 | JPEG | — | NOT STORED | 0 | 0 |
| 101 | NEW_12 | 8 | TXT | — | NOT STORED | 0 | 0 |
| ... | | | | | | | |
| 200 | CH2_MN | 7 | JPEG | 2000/01/14 | STORED | — | — |
| ... | | | | | | | |
| 210 | KIN_WT | 8 | MIX | 2000/01/14 | STORED | 2 | 1 |
| 220 | KAN_WT | 8 | MIX | 2000/01/14 | INCOMPLETE | — | — |
| ... | | | | | | | |
| 300 | CH3_MN | 6 | JPEG | — | STORED | — | — |
| 330 | CD_MN | 15 | JPEG | 2000/01/10 | NOT STORED | 3 | 2 |
| 340 | BGM_MN | 11 | LIC | — | NOT STORED | 4 | 3 |
| ... | | | | | | | |

FIG. 7

PROBLEM/SOLUTION TABLE

| PROBLEM ID | PROBLEM MESSAGE | REMARKS | SOLUTION ID | SOLUTION MESSAGE | REMARKS |
|---|---|---|---|---|---|
| 0 | COMPLETION OF BROADCAST | DETECTED BY STORAGE CONTROLLING UNIT 120 | 0 | TRY STORAGE AGAIN | ACQUISITION BY REACQUIRING UNIT 126 |
| 1 | HIGH BIT ERROR RATE | DETECTED BY RECEIVING UNIT 110 | 1 | DELETE UNNECESSARY DATA | MESSAGE DISPLAY |
| 2 | LIMITED STORAGE SPACE | MODULE STORING UNIT 130 | 2 | STORE LATER VERSION | ACQUISITION OF VERSION INFORMATION FROM STORAGE UNIT STORING UNIT 140, AND ACQUISITION OF LATER VERSION BY RECEIVING UNIT 110 |
| 3 | EXPIRATION | DELETED BY GARBAGE COLLECTING UNIT 122 | 3 | ACQUIRE LICENSE INFORMATION | ACQUISITION BY LICENSE ACQUIRING UNIT 125 |
| 4 | NONPAYMENT | LICENSE INFORMATION | 4 | ACQUIRE AGAIN | ACQUISITION BY RECEIVING UNIT 110 |
| 5 | DELETION BY USER EDIT | DETECTED BY EDITING UNIT 121 | ... | ... | ... |
| ... | ... | | | | |

FIG. 17

=CH2 : WEATHER/KANTO=

ID=220

DATA IS NOT STORED BECAUSE OF LIMITED STORAGE SPACE

| IBARAKI | SUNNY |
| TOCHIGI | SUNNY |
| GUNMA | CLOUDY |
| SAITAMA | CLOUDY |
| TOKYO | SUNNY, LATER CLOUDY |
| CHIBA | SUNNY, LATER CLOUDY |
| KANAGAWA | RAIN |
| YAMANASHI | RAIN |

( RETURN )   ( DELETE UNNECESSARY DATA )

FIG. 20

CH3 : MUSIC/BARGAIN CD
ID=330

DATA IS NOT STORED
BECAUSE OF
EXPIRATION

STORE LATER VERSION
631a

RETURN

FIG. 21

=CH3 : MUSIC/BGM PLAYBACK=
ID=340

DATA IS NOT STORED BECAUSE OF NONPAYMENT (RETURN) (ACQUIRE LICENSE INFORMATION)

DATA BROADCAST RECEIVING APPARATUS AND METHOD

BACKGROUND OF THE INVENTION

1. Field of the Invention

The present invention relates to a method and apparatus for receiving digital data broadcasts, and in particular relates to a technique of temporarily storing received broadcast data and later reproducing and outputting desired content.

2. Related Art

With digitization of broadcast systems, the development of data broadcast receiving apparatuses that provide a greater variety of functions than ever has been pursued in recent years. One type of such data broadcast receiving apparatuses is a storage-type apparatus. This apparatus temporarily stores received broadcast data in a storage medium such as an internal hard disk, reads user-selected content from the storage medium in accordance with link information included in the broadcast data, and reproduces and displays the content on a TV screen or the like.

With such a data broadcast receiving apparatus, the user can store a plurality of broadcast programs beforehand, and later reproduce a desired program at his or her leisure without concern for constraints such as a broadcast time.

SUMMARY OF THE INVENTION

The present invention aims to provide a storage-type data broadcast receiving apparatus and method for temporarily storing received broadcast data in a memory and later reproducing and outputting desired content, which can operate smoothly so as not to cause any confusion on the user's part even when the user requests content which is not stored in the memory.

The above object can be fulfilled by a data broadcast receiving apparatus for receiving broadcast data that includes a plurality of data modules which are linked by link information, including: a module storing unit for selectively storing data modules included in the received broadcast data; a user indication accepting unit for accepting an indication from a user; and a reproducing unit for (a) judging whether a target data module which is specified in accordance with the user indication and the link information is stored in the module storing unit, (b) when the target data module is stored in the module storing unit, reading the target data module from the module storing unit, and reproducing and outputting the read target data module, and (c) when the target data module is not stored in the module storing unit, outputting first information for informing the user that the target data module is not stored.

With this construction, when content which the user wants to view is not stored in the module storing unit, the user is informed that the content is not stored. Accordingly, the user will not be confused even when the desired content is not displayed.

The above object can also be fulfilled by a data broadcast receiving apparatus for receiving broadcast data that includes a plurality of data modules which are linked by link information, including: a module storing unit for selectively storing data modules included in the received broadcast data; a user indication accepting unit for accepting an indication from a user; and a reproducing unit for (a) reading a target data module which is specified in accordance with the user indication and the link destination, from the module storing unit, and reproducing and outputting the read target data module, (b) specifying, prior to the reproduction of the target data module, data modules which are link destinations of the target data module and therefore may be indicated by the user as the next target data module, with reference to the link information, (c) judging whether the link destination data modules of the target data module are all stored in the module storing unit, and (d) when any of the link destination data modules of the target data module is not stored in the module storing unit, informing the user that the link destination data module is not stored.

With this construction, the user is informed of the storage state of each link destination of content which is currently displayed. This enables the user to know in advance whether a particular link destination is available or not, with no need to actually select a selection button that links to the link destination.

The above object can also be fulfilled by a data broadcast receiving method which includes steps performed by the construction elements of the data broadcast receiving apparatus, or by a computer-readable recording medium recording a data broadcast receiving program which implements the steps on a computer.

BRIEF DESCRIPTION OF THE DRAWINGS

These and other objects, advantages and features of the invention will become apparent from the following description thereof taken in conjunction with the accompanying drawings that illustrate a specific embodiment of the invention. In the drawings:

FIG. 3 shows an example of module information included in module download information in the broadcast data;

FIG. 6 shows an example of storage information stored in a storage information storing unit shown in FIG. 5;

FIG. 7 shows an example of a problem/solution table stored in a problem/solution table storing unit shown in FIG. 5;

FIG. 17 shows an example display (Kanto weather forecast) when the user pressed a "KANTO" button on the display shown in FIG. 15;

FIG. 20 shows an example display when the user pressed a "BARGAIN CD" button on the display shown in FIG. 19; and FIG. 21 shows an example display when the user pressed a "BGM PLAYBACK" button on the display shown in FIG. 19.

DESCRIPTION OF THE PREFERRED EMBODIMENT(S)

The following is a description of an embodiment of the present invention, with reference to the drawings.

Figure 1:
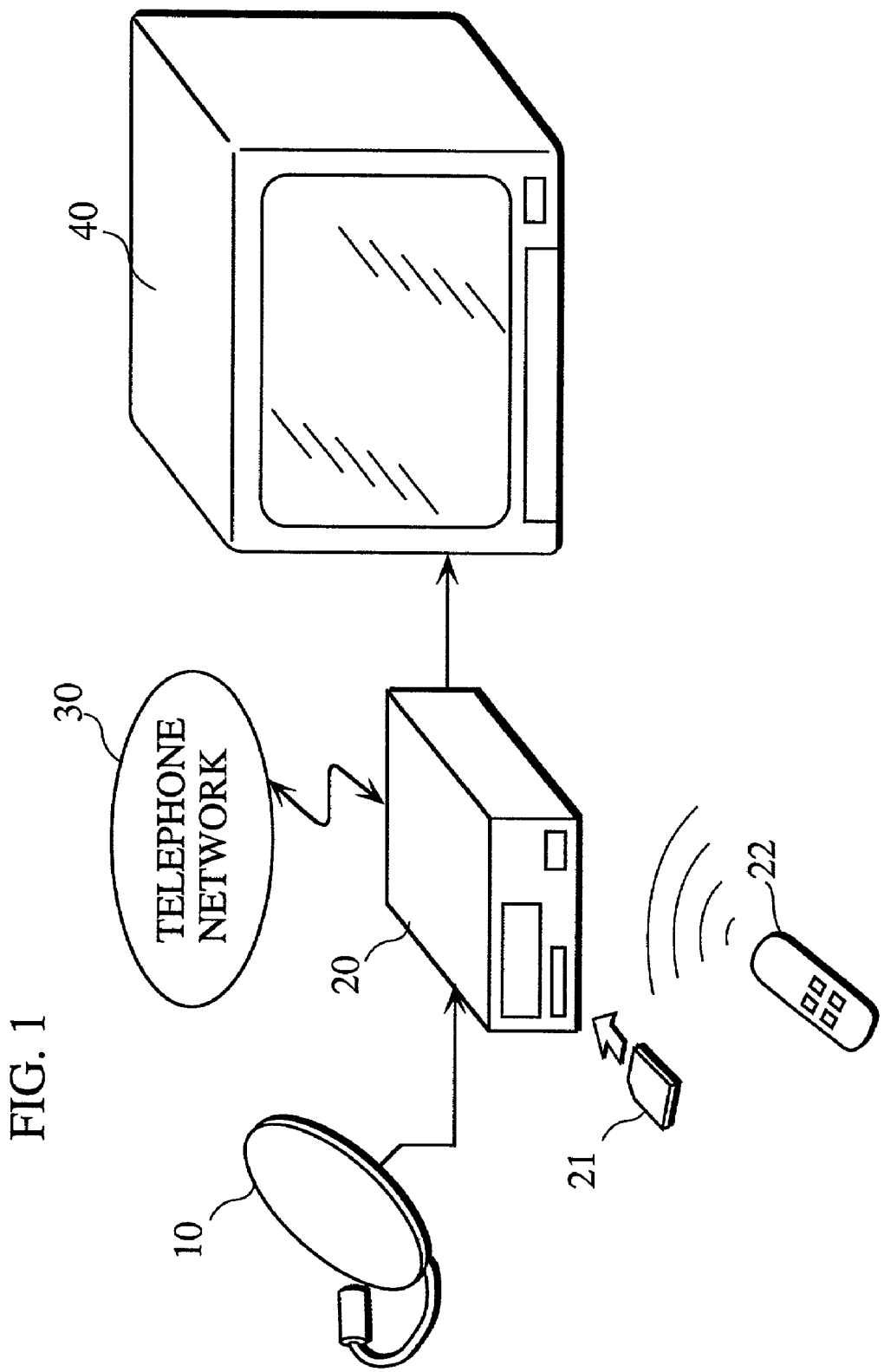
FIG. 1 is an external view of a data broadcast receiving system according to an embodiment of the invention.

FIG. 1 is an external view of a data broadcast receiving system according to the embodiment of the invention.

This data broadcast receiving system is a system for receiving digital data broadcasts. The data broadcast receiving system is roughly made up of an antenna 10 for receiving a data broadcast wave from a broadcast station via satellite or the like, a data broadcast receiving apparatus 20 for storing broadcast data included in the received broadcast wave and reproducing and outputting it as a video signal, and a television set (TV) 40 for displaying the video signal outputted from the data broadcast receiving apparatus 20.

The data broadcast receiving apparatus 20 is connected to a telephone network 30, and operates in accordance with signals sent from a remote control 22 manipulated by the user. The data broadcast receiving apparatus 20 uses a nonvolatile memory, such as a removable memory card 21 equipped with a flash memory or a hard disk equipped in the apparatus 20, as a storage medium. The operation of this data broadcast receiving apparatus 20 can be broadly divided into two modes, i.e. a real-time mode of receiving a data broadcast and reproducing it in real time, and a storage mode of receiving a data broadcast, temporarily storing the received broadcast data in the storage medium, and later reading the broadcast data from the storage medium and reproducing it.

Figure 2:
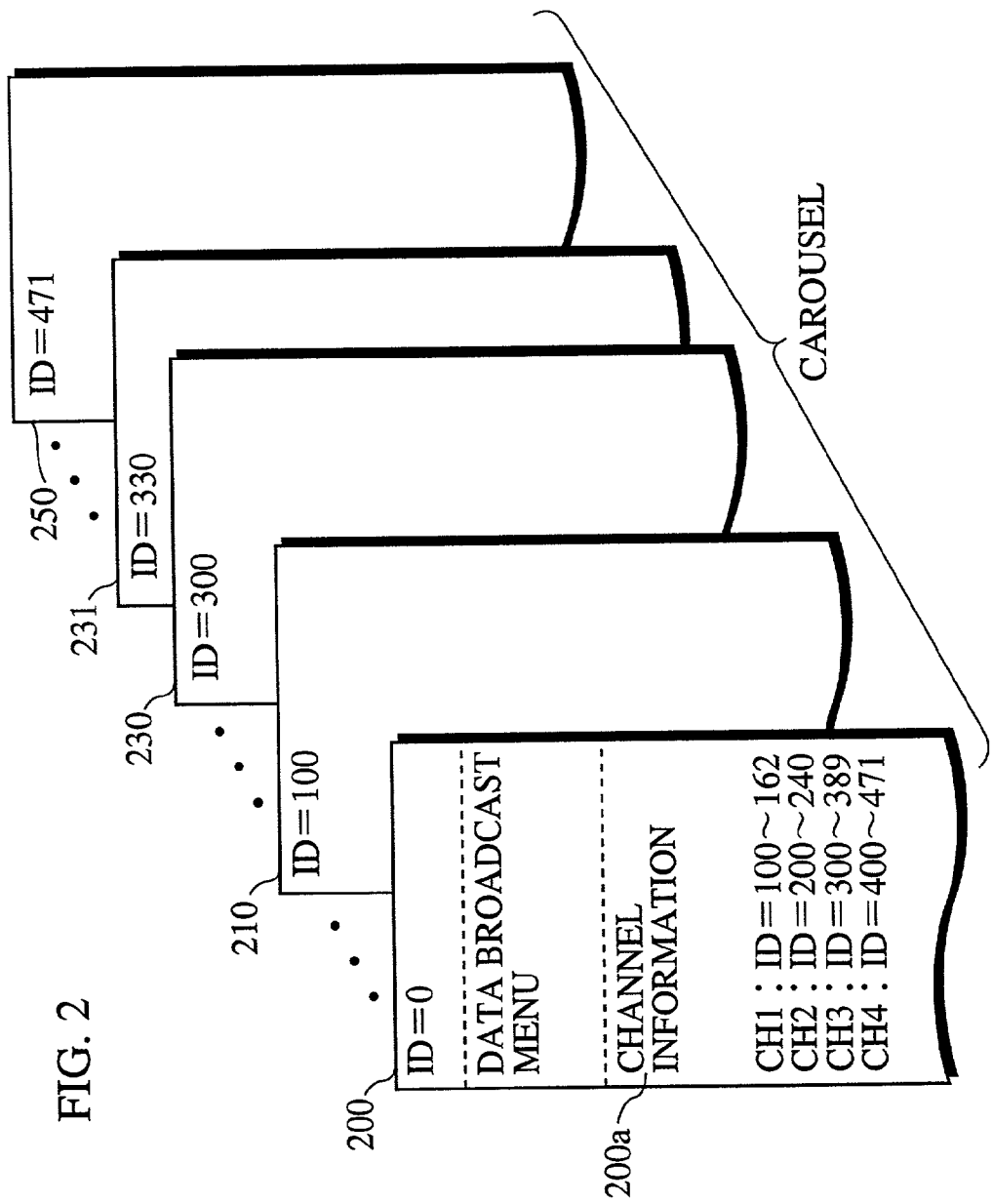
FIG. 2 shows an example structure of broadcast data handled in the data broadcast receiving system.

FIG. 2 shows an example structure of broadcast data handled in such a data broadcast receiving system.

The broadcast data is made up of module download information (not shown in the drawing) and 472 data modules (ID numbers 0 to 471), which make up a plurality of channels and are repeatedly transmitted in a regular time interval such as 6 seconds (carousel transmission). The broadcast data is transmitted as a transport stream, in which the module download information and the data modules are packetized and multiplexed.

The module download information is additional information which relates to data module groups 200–250 that constitute the carousel. The data module groups 200–250 are each composed of at least one out of the 472 data modules, and form digital content of the broadcast data. Here, a data module is a unit of link, and is made up of at least one set of resource information (i.e. at least one set of logical data such as a file).

A data module (ID number 0) that makes up a data module group 200, which comes first of the 472 data modules in FIG. 2, includes a data broadcast menu and channel information 200a used for selecting one of the plurality of channels (i.e. a broadcast program). In the drawing, the channel information 200a shows that channels CH1 to CH4 are respectively made up of data modules of ID numbers 100–162, 200–240, 300–389, and 400–471.

FIG. 3 shows an example of module information for each of the 472 data modules, which is included in the module download information preceding the 472 data modules. The module information shows the attributes of the data module such as "ID", "name", "version", "type", and "expiry date".

The attribute "type" shows a type of data which constitutes the data module, and is designated by a symbol such as "JPEG" for still image, "TXT" for text, "MIX" for a mixture of image and text, and "LIC" for chargeable data. Here, the still image and the text may be compressed/coded, and the chargeable data may further be encrypted.

The attribute "expiry date" shows an expiry date of the data module in the data broadcast receiving apparatus 20 in storage mode, after which the reproduction of the data module becomes impossible as the data module is deleted from the storage medium.

Figure 4:
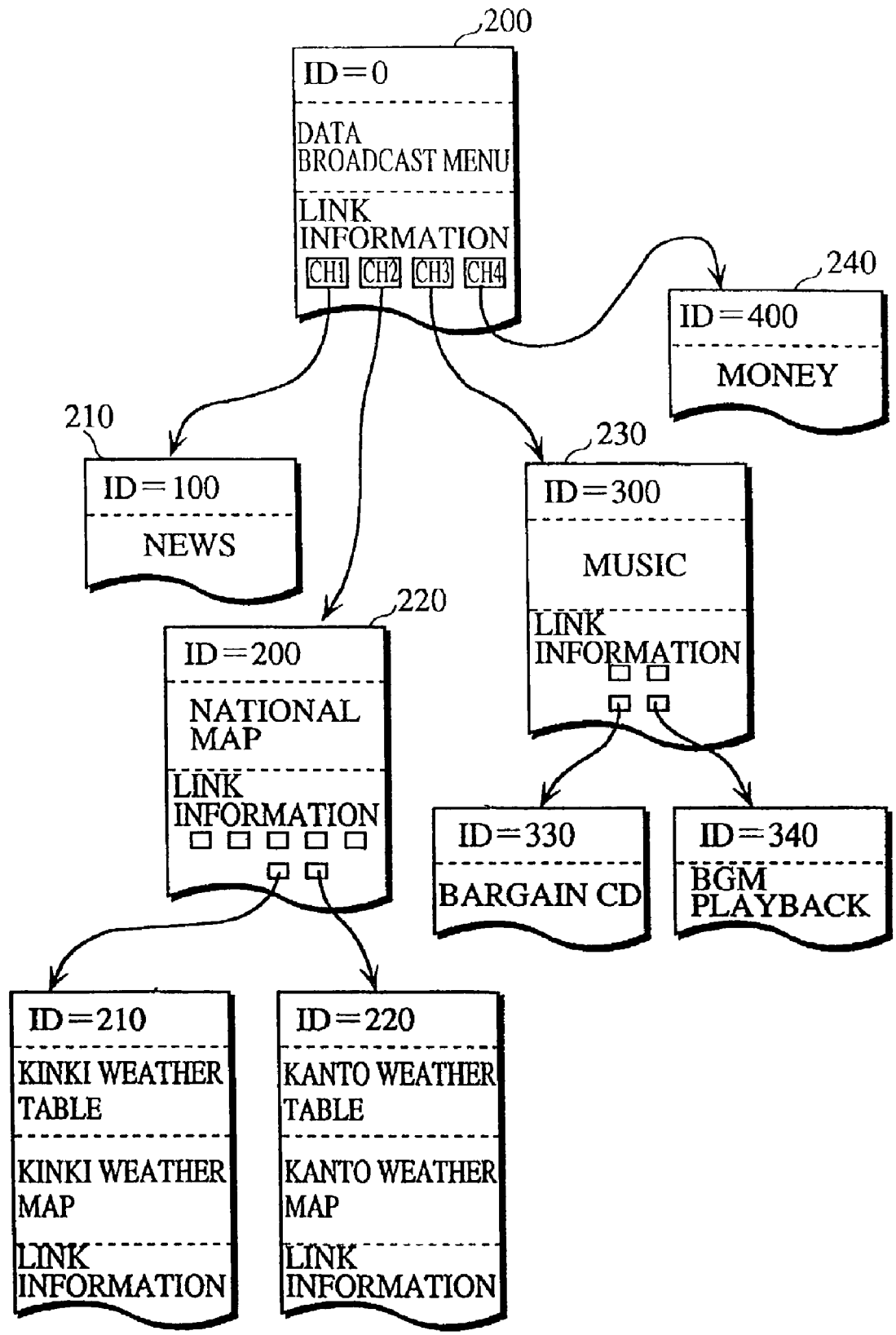
FIG. 4 shows an example of the contents of main data modules in the broadcast data shown in FIG. 2, and the links between these modules.

FIG. 4 shows an example structure of main data modules in the data module groups 200–250 shown in FIG. 2, where the contents of the data modules and the links between them are illustrated. A link from a source data module to a destination data module is designated by an arrow.

For instance, the data module (ID number 0) which of the data module group 200 which comes first of all data modules includes a still image of the data broadcast menu, the channel information mentioned above, and link information showing that channel selection buttons "CH1" to "CH4" included in the menu respectively correspond to a data module (ID number 100) that makes up a data module group 210 for a news channel, a data module (ID number 200) that makes up a data module group 220 for a weather channel, a data module (ID number 300) that makes up a data module group 230 for a music channel, and a data module (ID number 400) that makes up a data module group 240 for a money channel. This link information is used to specify content which should be displayed next when the user selects a display object from the data broadcast menu (when the user presses one of the channel selection buttons).

Figure 5:
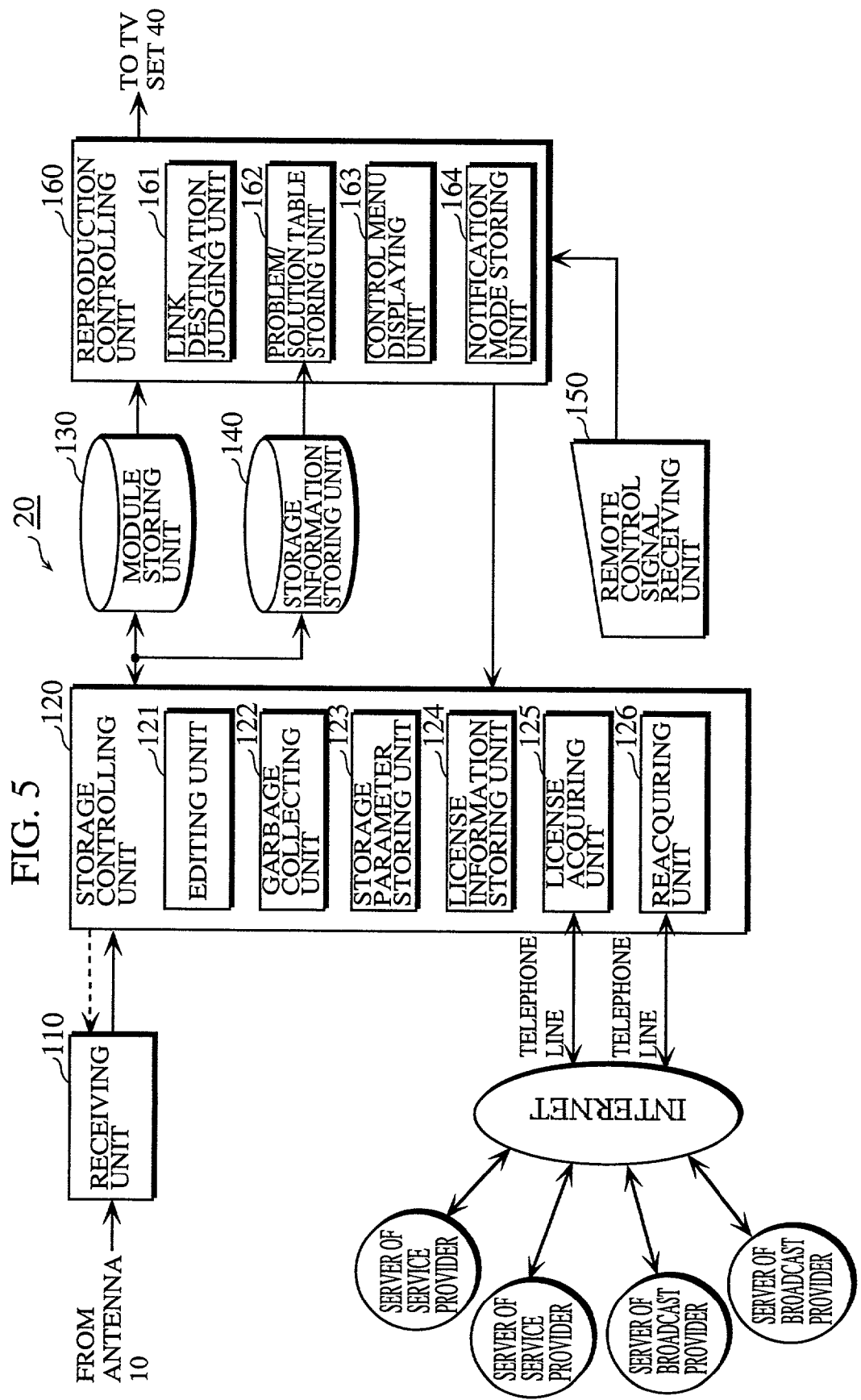
FIG. 5 is a functional block diagram of a construction of a data broadcast receiving apparatus in storage mode, according to the embodiment of the invention.

FIG. 5 is a functional block diagram of a construction of the data broadcast receiving apparatus 20 in storage mode. This data broadcast receiving apparatus 20 includes a receiving unit 110, a storage controlling unit 120, a module storing unit 130, a storage information storing unit 140, a remote control signal receiving unit 150, and a reproduction controlling unit 160.

The receiving unit 110 is provided with a demodulator, a filter, a bit error detector, and the like. The receiving unit 110 demultiplexes the transport stream received by the antenna 10, and selects only packets which are designated by the storage controlling unit 120. In so doing, the receiving unit 110 extracts only broadcast data that forms desired broadcast (s), and outputs it to the storage controlling unit 120. The receiving unit 110 also detects a bit error rate for each received data module, and notifies the storage controlling unit 120 of the error rate.

The module storing unit 130 and the storage information storing unit 140 are rewritable storage mediums which are each realized by the memory card 21 or the internal fixed hard disk, and are used respectively to store data modules and storage information corresponding to each data module. The storage information referred to here shows the storage state of the data module in the module storing unit 130, and so on.

FIG. 6 shows an example of part of the contents of the storage information storing unit 140. In the drawing, storage information corresponding to each of the data modules in the broadcast data includes eight data items concerning the data module. Among these, the five data items ("ID", "name", "version", "type", and "expiry date") are copied from module information of the data module included in the module download information in the broadcast data, whereas the other three data items ("storage state", "problem ID", and "solution ID") are newly added by the storage controlling unit 120.

Here, the data item "storage state" shows whether the data module is stored in the module storing unit 130. The data item "problem ID" is a number identifying a problem which is a reason why the data module is not stored in the module storing unit 130 in complete form. As an example, the problem ID "0" identifies a problem that the broadcast of the data module ended (i.e. the data module was not extracted by the receiving unit 100). The data item "solution ID" is a number identifying a solution for the problem identified by "problem ID". As an example, the solution ID "0" identifies a solution that the data module should be obtained not from a broadcast wave but from a server of a broadcast provider or information provider (service provider) via the telephone network 30.

The storage information also includes all additional information contained in the module download information of the broadcast data, in addition to the above eight data items which are listed in tabular form in FIG. 6.

The storage controlling unit 120 is provided with a CPU, a ROM storing a-control program, and the like. In accordance with an instruction from the reproduction controlling unit 160 or the like, the storage controlling unit 120 exercises control to store a new data module included in the received broadcast data into the module storing unit 130, and also store new module information included in the module download information in the broadcast data, into the storage information storing unit 140 as new storage information. The storage controlling unit 120 includes an editing unit 121, a garbage collecting unit 122, a storage parameter storing unit 123, a license information storing unit 124, a license acquiring unit 125, and a reacquiring unit 126.

The new data module (the new module information) mentioned here is a data module (module information) whose ID or name is designated as a storage target but is not present in the module storing unit 130 (the storage information storing unit 140), or a data module (module information) whose ID or name is present in the module storing unit 130 (the storage information storing unit 140) but whose version is later than that in the module storing unit 130 (storage information storing unit 140).

The editing unit 121 displays interactive graphics on the TV 40 through the reproduction controlling unit 160, and receives an indication from the user through the display. In accordance with this user indication, the editing unit 121 edits data modules, storage information, and license information stored respectively in the module storing unit 130, the storage information storing unit 140, and the license information storing unit 124.

The garbage collecting unit 122 checks an expiry date shown in storage information of each data module in the storage information storing unit 140, at midnight every day. If an expiry date of any of the data modules stored in the module storing unit 130 was reached (i.e. the expiry date of the data module was yesterday), the garbage collecting unit 122 deletes the data module from the module storing unit 130, to secure more free space. The garbage collecting unit 122 also changes the storage state shown in the storage information of the expired data module in the storage information storing unit 140, from "stored" to "not stored".

The storage parameter storing unit 123 has a storage area for storing storage parameters such as a channel code that specifies a channel designated by the user as a storage target, and trigger values that specify conditions for starting and ending the storage.

The license information storing unit 124 has a storage area for storing license information for each pay channel or chargeable data module. The license information includes information which specifies such a channel or data module, and a password which authenticates that the user has signed up for the channel or data module.

The license acquiring unit 125 acquires license information from the server of the broadcast provider or service provider via the telephone network 30, and stores it into the license information storing unit 124.

The reacquiring unit 126 connects to the server via the telephone network 30, acquires a required data module from the server, and stores it into the module storing unit 130.

The remote control signal receiving unit 150 receives a signal from the remote control 22 and decodes it. In so doing, the remote control signal receiving unit 150 specifies a selection button which the user has selected with the remote control 22, and notifies the reproduction controlling unit 160 of the user selection.

The reproduction controlling unit 160 is provided with a CPU, a D/A convertor, a ROM storing a control program, and the like. The reproduction controlling unit 160 reads a data module and storage information respectively from the module storing unit 130 and the storage information storing unit 140 in accordance with a user instruction notified by the remote control signal receiving unit 150, processes (e.g. decompresses, decodes, decrypts) the data module as necessary, and reproduces an analog video and audio signal and outputs it to the TV 40. The reproduction controlling unit 160 also generates a graphics image signal for interaction with the user, and outputs it to the TV 40. The reproduction controlling unit 160 also instructs the license acquiring unit 125 to acquire license information, or the reacquiring unit 126 to acquire a data module, according to a user instruction notified from the remote control signal receiving unit 150. The reproduction controlling unit 160 includes a link destination judging unit 161, a problem/solution table storing unit 162, a control menu displaying unit 163, and a notification mode storing unit 164.

The link destination judging unit 161 judges whether a data module selected by the user is stored in the module storing unit 130, by referring to storage information of the data module in the storage information storing unit 140. To be more specific, the link destination judging unit 161 searches the storage information storing unit 140 for the storage information of the data module by referring to the "name" field, and judges from the storage state shown in the storage information whether the data module is completely stored (i.e. all sets of resource information which make up the data module are stored) ("stored"), the data module is not stored at all ("not stored"), or the data module is incompletely stored (i.e. at least one of the sets of resource information is missing) ("incomplete").

The problem/solution table storing unit 162 stores a problem/solution table which lists a problem message corresponding to each problem ID in the "problem ID" field in the storage information storing unit 140, and a solution message corresponding to each solution ID in the "solution ID" field in the storage information storing unit 140. Here, the problem message is a message for informing the user of a problem when the user selects a data module but that data module is not stored or is incompletely stored in the module storing unit 130, whereas the solution message is a message for suggesting a solution for the problem to the user.

FIG. 7 shows an example of the problem/solution table stored in the problem/solution table storing unit 162. Note here that the two "remarks" fields are actually not included in the table but are illustrated for convenience of explanation.

The problem ID "0" corresponds to the case where the broadcast of the data module selected by the user ended (i.e. the data module was not extracted). The problem ID "1" corresponds to the case where the data module had a bit error rate no smaller than a predetermined level. The problem ID "2" corresponds to the case where free space in the module storing unit 130 was no greater than allowable level for further storage. The problem ID "3" corresponds to the case where the data module expired and was automatically deleted from the module storing unit 130 by the garbage collecting unit 122. The problem ID "4" corresponds to the case where the data module was chargeable but no license information for authenticating that the user has signed up for the data module was found in the license information storing unit 124. The problem ID "5" corresponds to the case where the data module was deleted from the module storing unit 130 by the editing unit 121.

Each of these problem IDs is associated with a problem message, a solution ID, and a solution message, as shown in FIG. 7.

The control menu displaying unit 163 displays a control menu on the TV 40 so that the user can indicate various operations to the data broadcast receiving apparatus 20. The control menu displaying unit 163 then receives the user indication made with the remote control 22 via the remote control signal receiving unit 150, and sets the contents of the indication in the storage parameter storing unit 123, the license information storing unit 124, and the notification mode storing unit 164.

Figure 8:
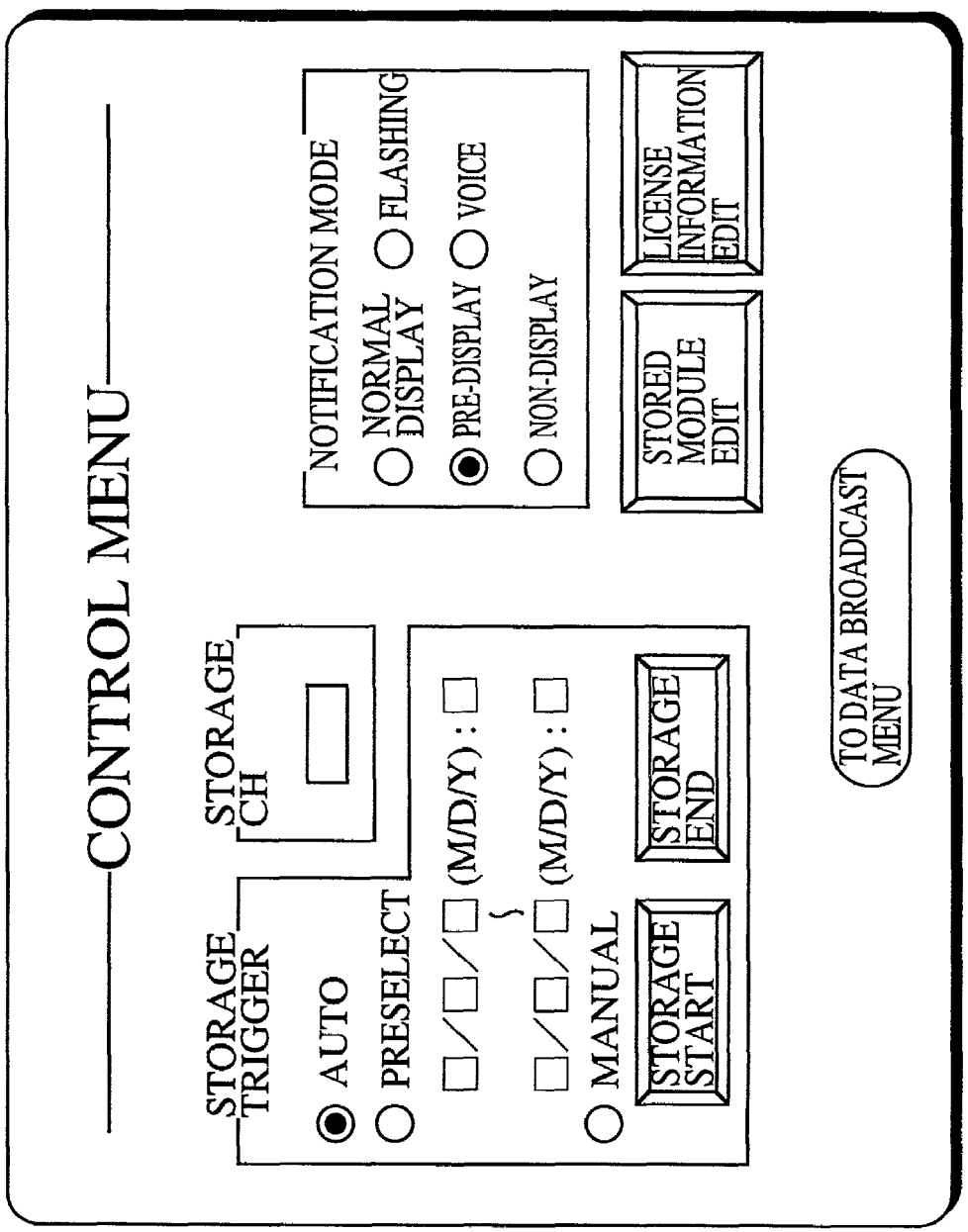
FIG. 8 shows an example of a control menu displayed on a TV screen by a control menu displaying unit shown in FIG. 5.

FIG. 8 shows an example of the control menu displayed on the TV 40 by the control menu displaying unit 163. The control menu has five sections, namely, a "STORAGE TRIGGER" menu, a "STORAGE CH" menu, a "NOTIFICATION MODE" menu, a "STORED MODULE EDIT" button, and a "LICENSE INFORMATION EDIT" button.

From the "STORAGE CH" menu, the user specifies a channel which is to be stored. For example, the channel CH3 is specified by inputting "CH3", while the channels CH1–CH4 are specified by inputting "CH1–CH4".

From the "STORAGE TRIGGER" menu, the user sets a trigger mode that specifies the conditions of starting and finishing the storage. Here, "AUTO" means continuously storing all new data modules as space of the module storing unit 130 allows, "PRESELECT" means storing data modules from a preset start date and time to a preset end date and time, and "MANUAL" means storing data modules from when the user presses a "STORAGE START" button until when the user presses a "STORAGE END" button.

The contents of the user indication (the channel code and the trigger values) made through the "STORAGE CH" menu and the "STORAGE TRIGGER" menu are stored into the storage parameter storing unit 123 by the control menu displaying unit 163, and put to use in the storage controlling unit 120.

Also, from the "NOTIFICATION MODE" menu, the user sets a notification mode ("NORMAL DISPLAY", "PRE-DISPLAY", "NON-DISPLAY", "FLASHING", or "VOICE") for incomplete selection buttons. An incomplete selection button referred to here is a selection button which is linked to a data module that is not stored or incompletely stored in the module storing unit 130. On the other hand, a complete selection button is a selection button which is linked to a data module that is completely stored in the module storing unit 130. This user setting (notification mode parameter) made through the "NOTIFICATION MODE" menu is stored into the notification mode storing unit 164 by the control menu displaying unit 163, and put to use in the reproduction controlling unit 160.

Here, "NORMAL DISPLAY" means the incomplete selection buttons are displayed without being distinguished from the complete selection buttons. "PRE-DISPLAY" means the incomplete selection buttons are displayed as distinguished from the complete selection buttons. "NON-DISPLAY" means the incomplete selection buttons are not displayed. "FLASHING" means the incomplete selection buttons are flashed on and off. "VOICE" means the incomplete selection buttons are notified to the user by voice output. A type of display accompanying the "VOICE" notification may be any of "NORMAL DISPLAY", "PRE-DISPLAY", "NON-DISPLAY", and "FLASHING".

Also, by pressing the "STORED MODULE EDIT" button, the user switches to a screen display for editing data modules stored in the module storing unit 130, which enables the user to look into a list of the stored data modules and edit them (e.g. delete a data module). When the user presses this button, the control menu displaying unit 163 informs the editing unit 121 as such. The editing unit 121 accordingly interacts with the user through the TV 40 and the remote control 22, and renews the contents of the module storing unit 130 and storage information storing unit 140 in accordance with the user interaction.

Also, by pressing the "LICENSE INFORMATION EDIT" button, the user switches to a screen display for editing license information stored in the license information storing unit 124, which enables the user to edit the contents of the license information storing unit 124 (e.g. register new license information). When the user presses this button, the control menu displaying unit 163 informs the editing unit 121 as such. The editing unit 121 then interacts with the user through the TV 40 and the remote control 22, and renews the contents of the license information storing unit 124 in accordance with the user interaction.

Further, by pressing a "TO DATA BROADCAST MENU" button at the bottom of the display in FIG. 8, the user switches from the control menu to the data broadcast menu for reproducing stored data modules.

The above constructed data broadcast receiving apparatus 20 operates in the following way.

Figure 9:
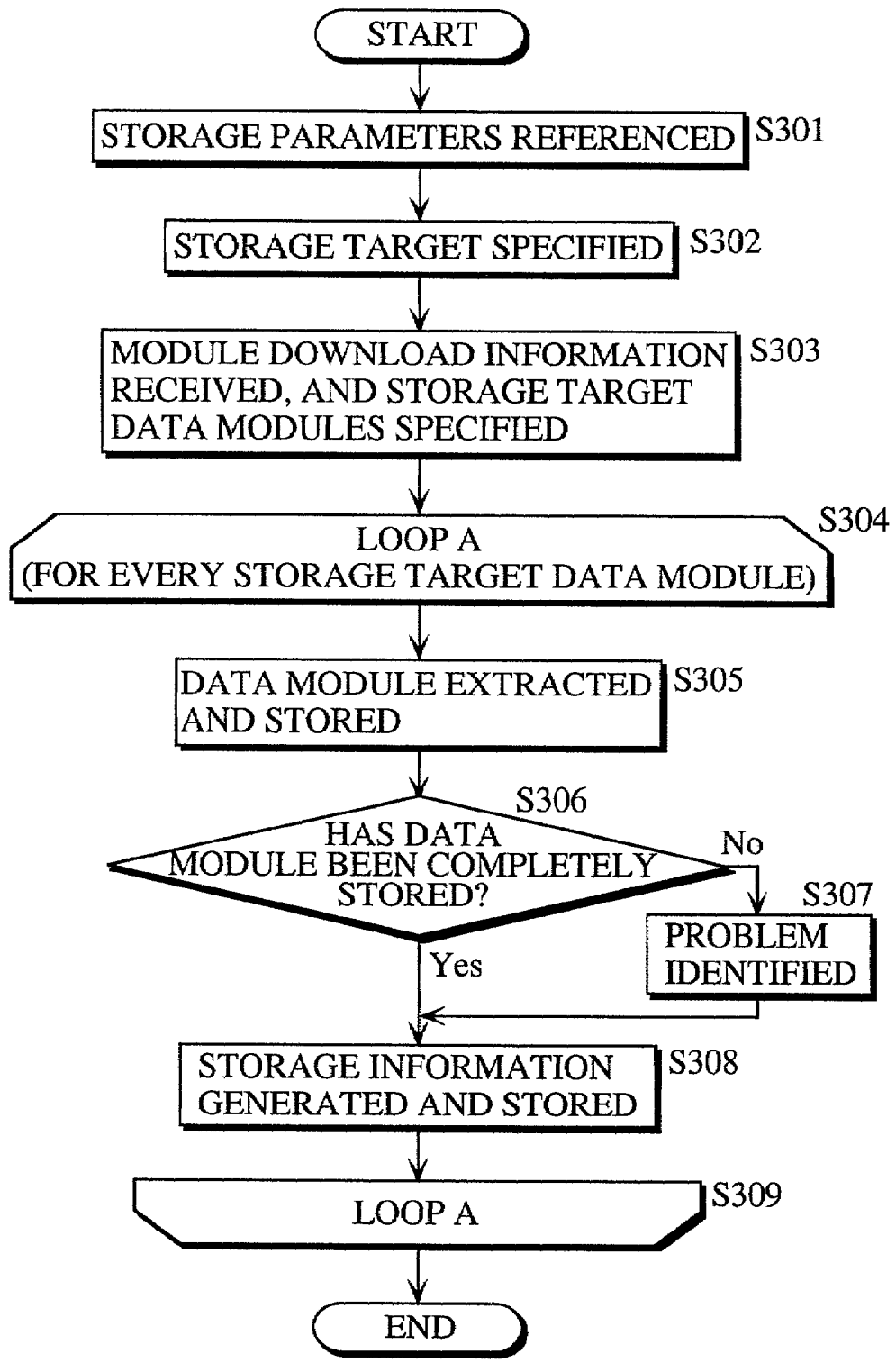
FIG. 9 is a flowchart of an operation of storing broadcast data by the data broadcast receiving apparatus.

FIG. 9 is a flowchart showing an operation of storing broadcast data by the data broadcast receiving apparatus 20.

First, the storage controlling unit 120 refers to the storage parameters stored in the storage parameter storing unit 123 (S301), to specify content that has been designated by the user as the storage target (S302). For example, the storage controlling unit 120 specifies content of the channels CH1–CH4 from 20:00 to 21:00 on Jan. 20, 2000, as the storage target.

The storage controlling unit 120 acquires the module download information and the first data module with the ID number "0" (i.e. the data module group 200) included in the broadcast data which is being broadcasted, and refers to the channel information 200a in the first data module to specify data modules that compose the channels CH1–CH4, as preparation for the actual storage (S303).

After this, the storage controlling unit 120 monitors an internal clock/calendar, to check whether the condition for starting the storage is met (e.g. whether the clock/calendar points to 20:00 on Jan. 20, 2000). On detecting that the storage start condition is met, the storage controlling unit 120 repeats the extraction of a storage target data module from the broadcast data and the storage of the data module in the module storing unit 130, until the condition for ending the storage is met (e.g. until the clock/calendar points to 21:00 on Jan. 20, 2000) (S304–S309).

To be more specific, the storage controlling unit 120 extracts the storage target data module from the broadcast data sent from the receiving unit 110, and attempts to store it into the module storing unit 130 (S305).

If the storage controlling unit 120 has succeeded in extracting and storing the data module in complete form (S306), the storage controlling unit 120 adds a data item which shows a storage state as "stored", to module information corresponding to the data module in the module download information. In so doing, the storage controlling unit 120 generates storage information of the data module, and stores it into the storage information storing unit 140 (S308).

If the storage controlling unit 120 has not succeeded in extracting and storing the complete data module (S306), the storage controlling unit 120 identifies a problem that has caused the storage failure (S307). The storage controlling unit 120 then adds a data item showing a storage state, a data item showing a problem ID, and a data item showing a solution ID corresponding to the problem ID, to the module information corresponding to the data module in the module download information. In so doing, the storage controlling unit 120 generates storage information of the data module, and stores it into the storage information storing unit 140 (S308).

Here, if the storage controlling unit 120 has failed to store all sets of resource information that compose the data module, the storage controlling unit 120 sets the storage state as "not stored", whereas if the storage controlling unit 120 has failed to store part of the sets of resource information, the storage controlling unit 120 sets the storage state as "incomplete". If the storage failure is because the broadcast of the data module ended (i.e. the data module was not extracted), the storage controlling unit 120 sets the problem ID as "0" and the solution ID as "0". If the storage failure is because the bit error rate of the data module was no smaller than the predetermined level, the storage controlling unit 120 sets the problem ID as "1" and the solution ID as "0". If the storage failure is because free space in the module storing unit 130 was no greater than the allowable level, the storage controlling unit 120 sets the problem ID as "2" and the solution ID as "1". If the storage failure is because the data module was chargeable but the user did not signed up for the data module, the storage controlling unit 120 sets the problem ID as "4" and the solution ID as "3".

Figure 10:
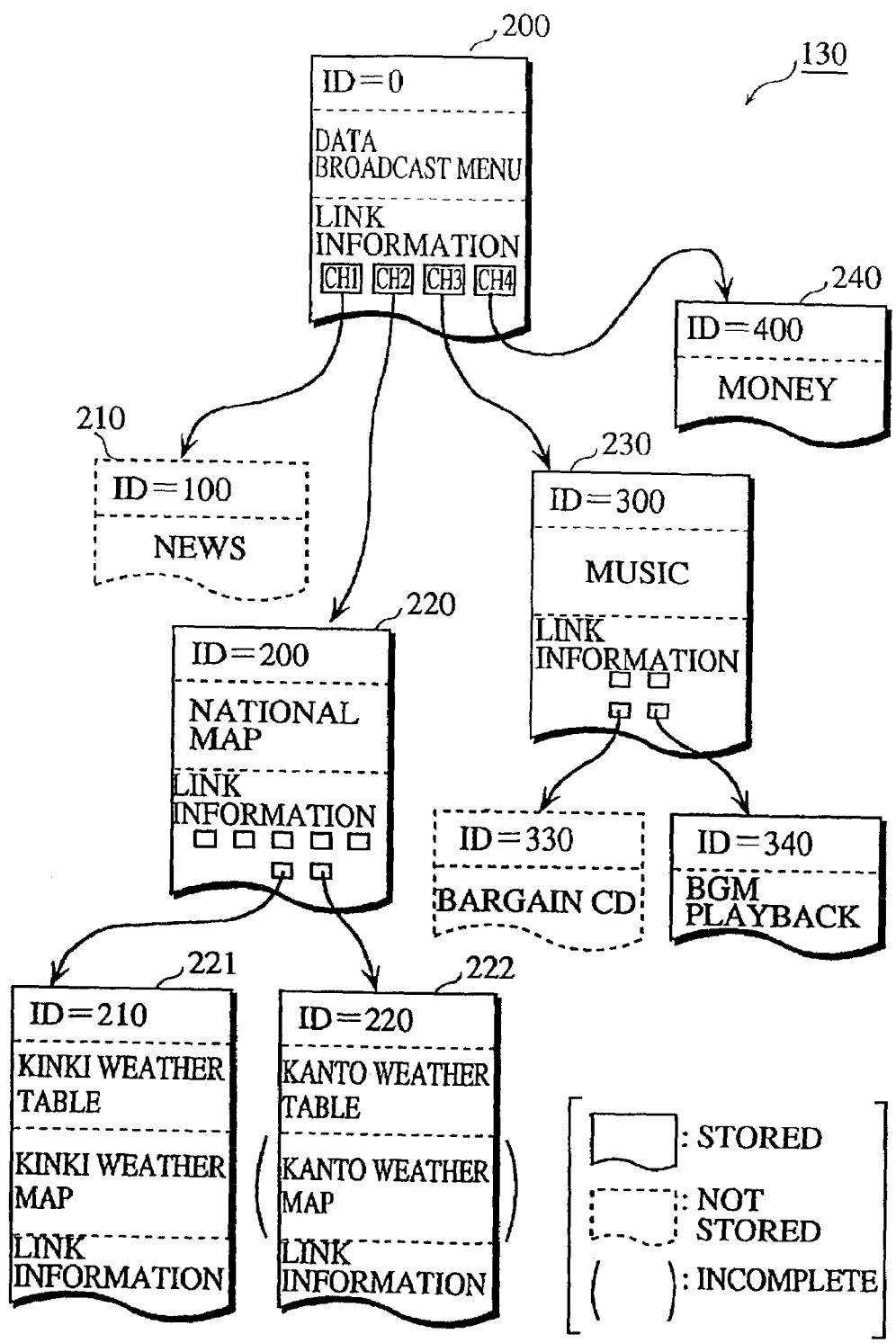
FIG. 10 shows an example of the storage states of data modules in a module storing unit shown in FIG. 5.
Figure 15:
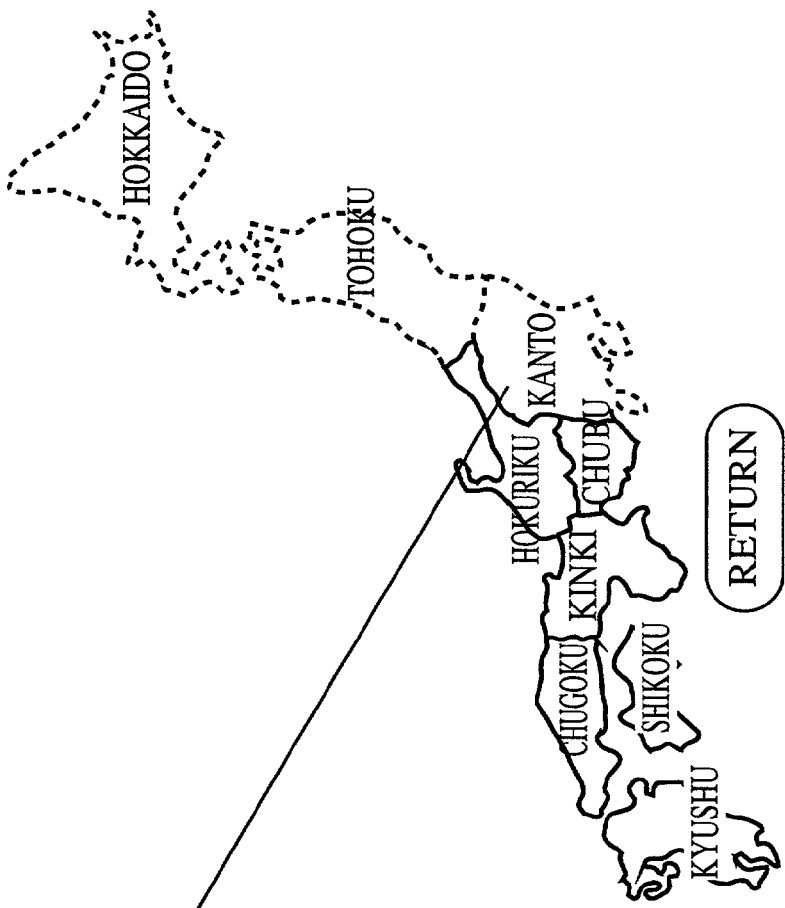
FIG. 15 shows an example display (weather channel top menu) when the user pressed a "CH2 WEATHER" button on the display shown in FIG. 13.

Suppose data modules are stored in the module storing unit 130 as shown in FIG. 10, as a result of the above operation. It is to be noted that in actuality the data modules are stored in a language such as BML (Bean Markup Language) or in a bitmap format (an example of data that represents a Kanto map in a data module (ID number 200) in FIG. 10 is shown in FIG. 15). This being so, the contents of the storage information storing unit 140 are as shown in FIG. 6. For instance, a data module (ID number 100) that constitutes a data module group 210 is not stored in the module storing unit 130 because its broadcast ended, whereas a data module (ID number 220) that constitutes a data module group 222 is stored in the module storing unit 130 but lacks a set of resource information representative of a Kanto weather map, due to limited free space in the module storing unit 130.

Figure 11:
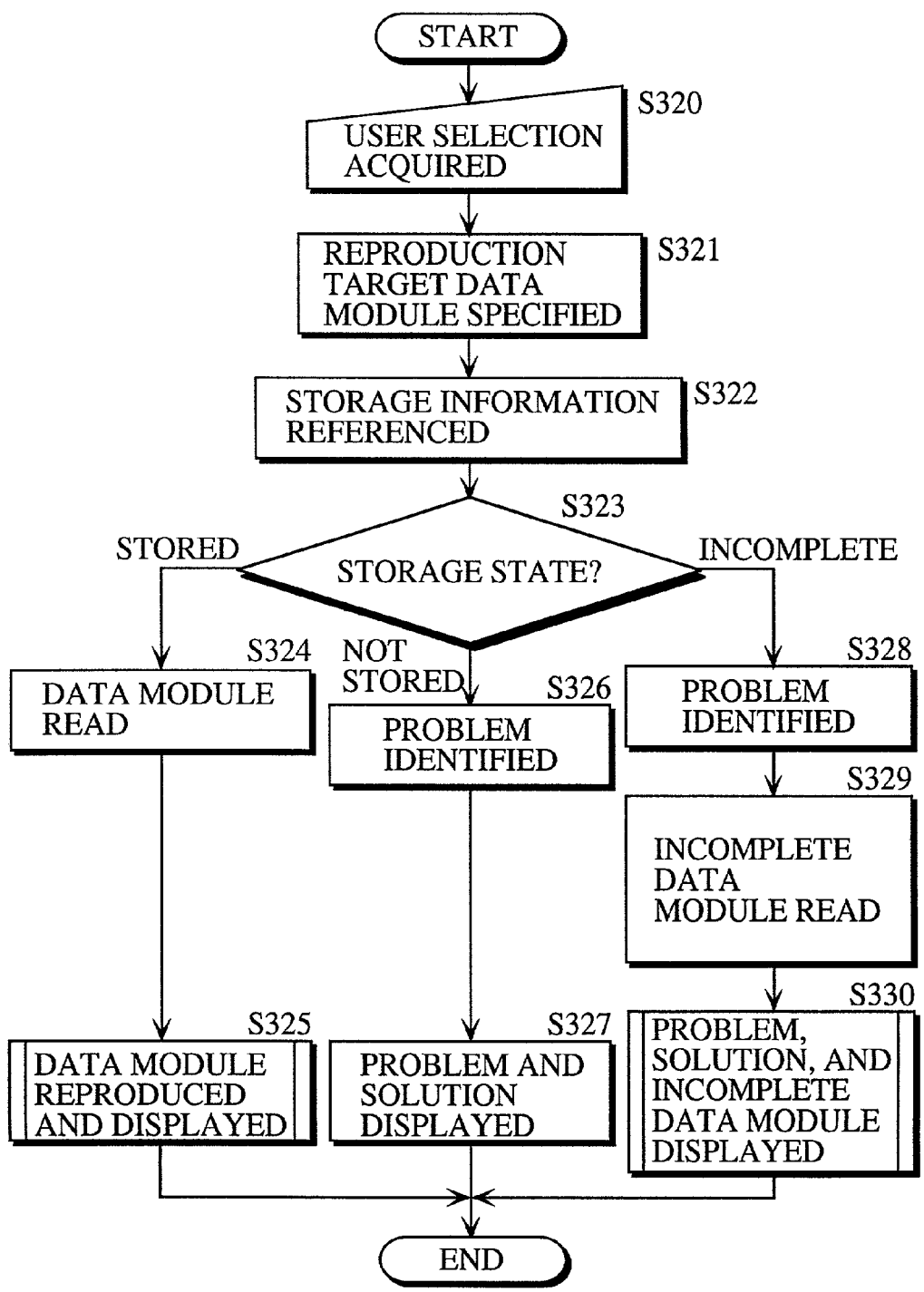
FIG. 11 is a flowchart of an operation of reproducing stored broadcast data by the data broadcast receiving apparatus.

FIG. 11 is a flowchart of an operation of reproducing stored data modules by the data broadcast receiving apparatus 20. Here, a procedure of displaying a screen display corresponding to a data module selected by the user is explained.

The reproduction controlling unit 160 acquires a user selection (e.g. a selection of a selection button on a screen display which is currently displayed on the TV 40) from the remote control signal receiving unit 150 (S320). Based on the user selection and link information included in the data module which is currently displayed, the reproduction controlling unit 160 specifies an ID or name of a data module which should be displayed next (a reproduction target data module) (S321).

Following this, the link destination judging unit 161 refers to the "ID" or "name" field in the storage information storing unit 140, and reads storage information that has the specified ID or name (S322).

The link destination judging unit 161 then judges, based on a storage state shown in the read storage information, whether the reproduction target data module is completely stored, not stored, or incompletely stored (S323).

If the reproduction target data module is completely stored, the reproduction controlling unit 160 reads the data module from the module storing unit 130 (S324), processes (e.g. decodes) the data module as necessary, and reproduces and outputs the result as a video and audio signal. Thus, the desired content is displayed on the TV 40 (S325).

If the data module is not stored at all, the reproduction controlling unit 160 reads, from the problem/solution table storing unit 162, a problem message and solution message corresponding to a problem ID and solution ID shown in the read storage information (S326), and displays these messages on the TV 40 (S327).

If the data module is incompletely stored, on the other hand, the reproduction controlling unit 160 reads, from the problem/solution table storing unit 162, the problem message and solution message corresponding to the problem ID and solution ID in the read storage information (S328). The reproduction controlling unit 160 also reads the incomplete data module (stored sets of resource information) from the module storing unit 130 (S329), and displays an image that contains the problem message, the incomplete data module, and the solution message, on the TV 40 (S330).

Thus, even when content which the user wants to view is not displayed or is only partially displayed, a problem that has caused such a failure is displayed together with a button suggesting a solution for the problem, with it being possible to eliminate any confusion for the user.

Figure 12:
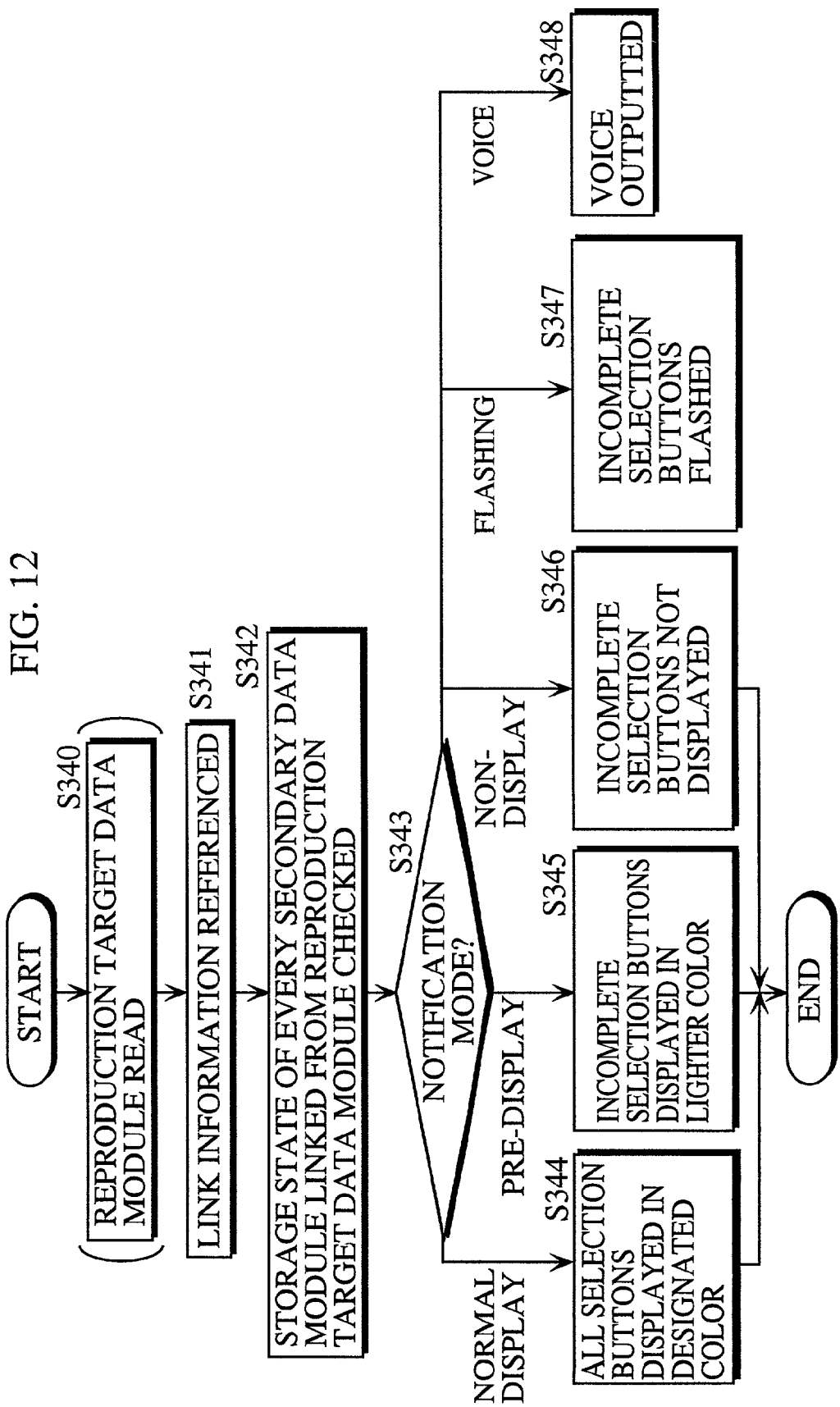
FIG. 12 is a flowchart of a detailed operation of displaying a data module in steps S325 and S330 in FIG. 11.

FIG. 12 is a flowchart of a detailed operation of displaying a data module on the TV 40 in steps S325 and S330 shown in FIG. 11, with emphasis on the handling of incomplete selection buttons.

The reproduction controlling unit 160 reads the reproduction target data module from the module storing unit 130 (S340, corresponding to steps S324 and S329 in FIG. 11), and determines a display mode of each. selection button contained in the reproduction target data module (S341–S343).

To be more specific, the reproduction controlling unit 160 refers to link information included in the reproduction target data module, and specifies link destinations corresponding to all selection buttons contained in the reproduction target data module (hereinafter, the data modules which are the link destinations of the reproduction target data module are called "secondary data modules") (S341).

The link destination judging unit 161 refers to the storage information storing unit 140, and judges whether all of the secondary data modules are stored in the module storing unit 130. Based on this judgement, the link destination judging unit 161 regards selection buttons of secondary data modules which are stored in the module storing unit 130, as complete selection buttons, and selection buttons of secondary data modules which are not stored or incompletely stored in the module storing unit 130, as incomplete selection buttons (S342).

Next, the reproduction controlling unit 160 refers to the notification mode storing unit 164, and judges whether the incomplete selection button notification mode is normal display, pre-display, non-display, flashing, or voice (S343).

If the notification mode is normal display, the reproduction controlling unit 160 displays the reproduction target data module on the TV 40, as it is (S344).

If the notification mode is pre-display, the reproduction controlling unit 160 displays the reproduction target data module on the TV 40, in which the complete selection buttons are displayed in a designated color while the incomplete selection buttons are displayed in the designated color but with lower brightness (S345).

If the notification mode is non-display, the reproduction controlling unit 160 displays the reproduction target data module on the TV 40, in which the complete selections buttons are displayed in the designated color while the incomplete selections buttons are dropped (not displayed) (S346).

If the notification mode is flashing, the reproduction controlling unit 160 displays the reproduction target data module on the TV 40, in which the complete selection buttons are displayed in the designated color while the incomplete selection buttons are flashed on and off (S347).

If the notification mode is voice, the reproduction controlling unit 160 notifies the user of the incomplete selection buttons through voice output (S348). The display of the reproduction target data module in this case may be any of normal display, pre-display, non-display, and flashing.

Thus, if a link destination of a data module which is currently displayed on the TV 40 is not available, the user is informed of the unavailability of the link destination by means of pre-display, non-display, flashing, voice, or the like. Hence the user can know whether content which is to be displayed when pressing a selection button is complete or not, without actually pressing the button.

The following is an explanation of a specific operation of the data broadcast receiving apparatus 20, using examples of screen displays on the TV 40.

Figure 13:
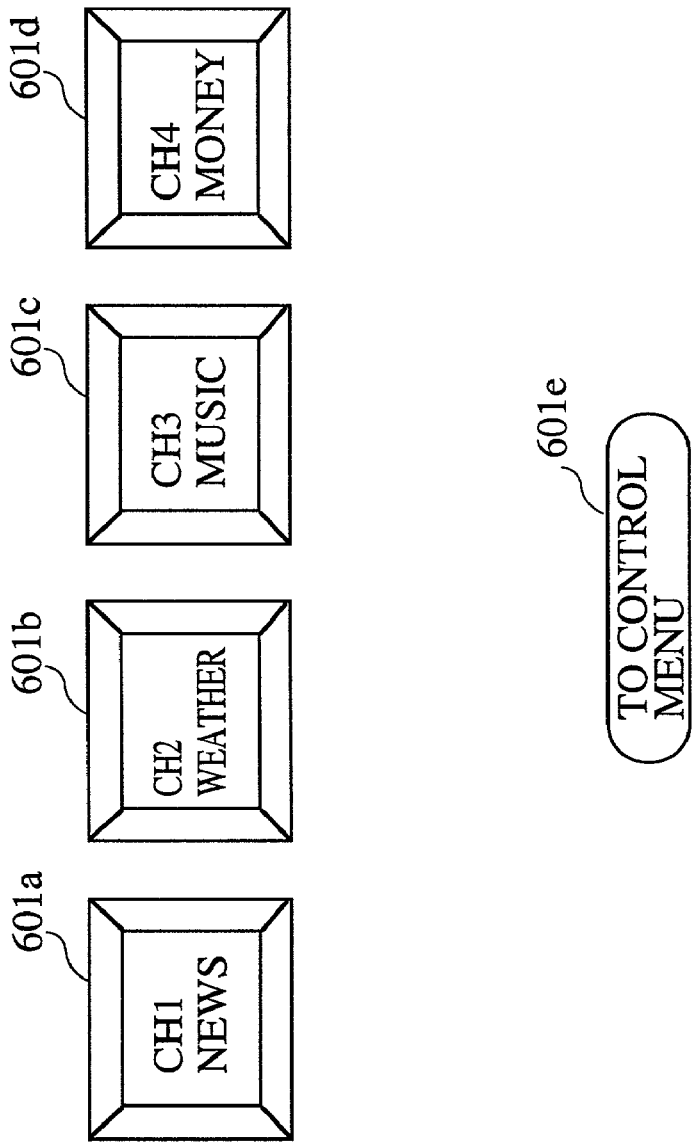
FIG. 13 shows an example display (data broadcast menu) before reproduction of broadcast data stored in the module storing unit is started.

FIG. 13 shows an example display (data broadcast menu) before the user starts reproduction of a data module stored in the module storing unit 130.

This display is produced as follows. On receiving a user request for reproduction of broadcast data, the reproduction controlling unit 160 reads from the storage information storing unit 140 the name "TOP_MN" of the data module which contains the data broadcast menu to be displayed first, reads the data module (ID number 0) from the module storing unit 130, and displays it on the TV 40 together with additional graphics.

Which is to say, selection buttons 601a–601d corresponding to the four channels CH1–CH4 are described in sets of resource information in the data module (ID number 0) that represents an image (JPEG) of the data broadcast menu, whereas a "TO CONTROL MENU" button 601e at the bottom of the display is a graphics image created by the reproduction controlling unit 160.

By pressing one of the selection buttons 601a–601d using the arrow keys on the remote control 22 or the like, the user can look into one of the four broadcast programs "NEWS", "WEATHER", "MUSIC", and "MONEY" in an interactive manner. By pressing the "TO CONTROL MENU" button 601e, meanwhile, the user can return to the control menu shown in FIG. 8.

Such switching to a display of a desired channel is done by reference to the link information of the data module (ID number 0) by the reproduction controlling unit 160.

Figure 14:
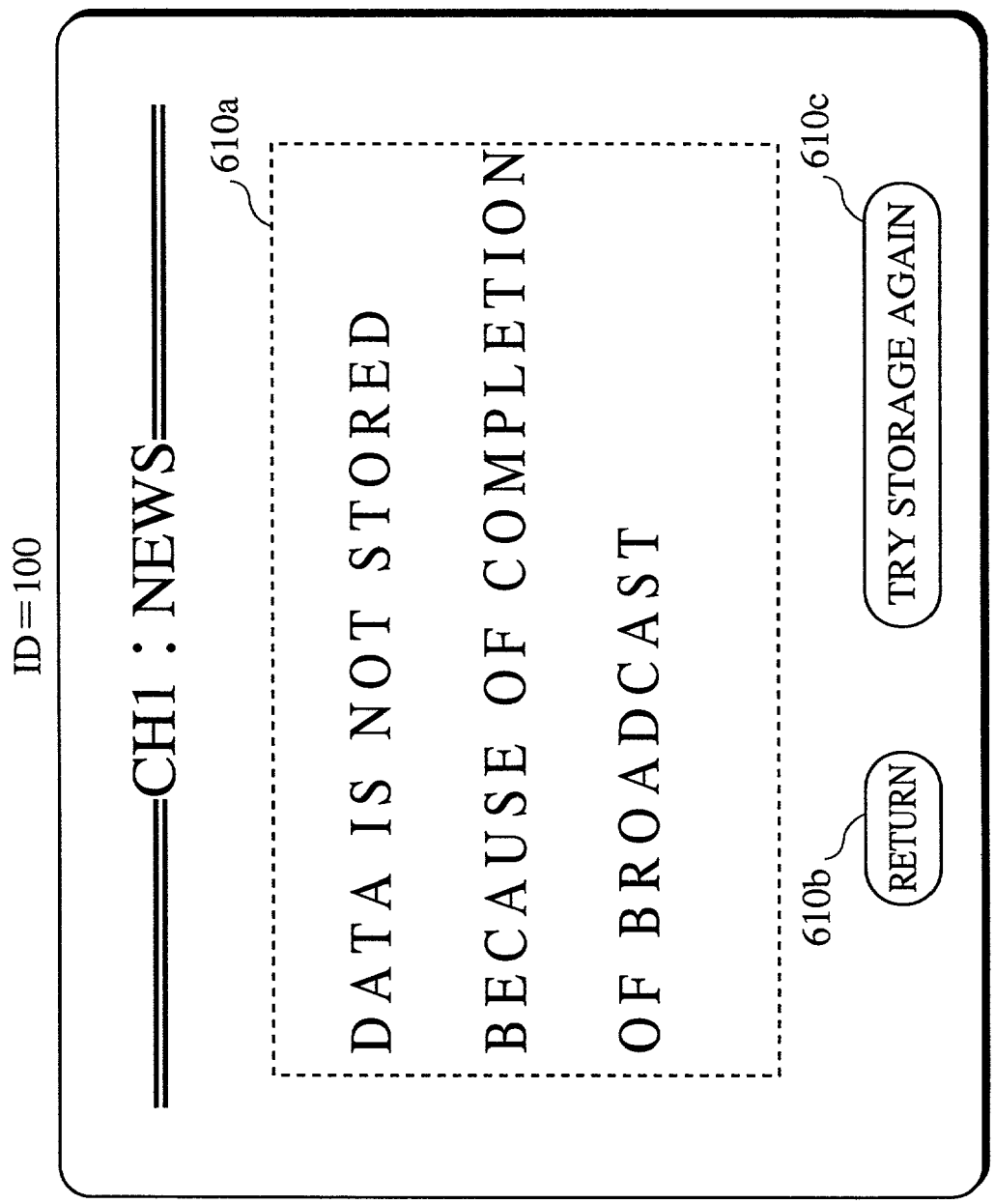
FIG. 14 shows an example display (news channel top menu) when the user pressed a "CH1 NEWS" button on the display shown in FIG. 13.

FIG. 14 shows an example display (news channel top menu) when the user pressed the "CH1 NEWS" button 601a on the display shown in FIG. 13.

This display is produced as follows. On receiving a user selection of the button 601a on the display of the data module (ID number 0) in FIG. 13, the reproduction controlling unit 160 refers to the link information (see FIG. 10) included in the data module (ID number 0), and detects an ID number (100) or name (CH1_MN) of a data module that is the link destination of the button 601a. The reproduction controlling unit 160 then searches the storage information storing unit 140 for storage information of the data module using the detected ID or name, and finds that the data module (ID number 100) is not stored in the module storing unit 130. The reproduction controlling unit 160 reads a problem ID and a solution ID from the storage information of the data module (ID number 100) in the storage information storing unit 140, and reads a problem message and a solution message corresponding to the problem ID and the solution ID from the problem/solution table storing unit 162. As a result, the problem message "COMPLETION OF BROADCAST" and the solution message "TRY STORAGE AGAIN" are read respectively for the problem ID "0" and the solution ID "0". The reproduction controlling unit 160 displays these messages on the TV 40 together with additional graphics.

Which is to say, the message "COMPLETION OF BROADCAST" and the message "TRY STORAGE AGAIN" in FIG. 14 were read from the problem/solution table storing unit 162, whereas a message "DATA IS NOT STORED BECAUSE OF" was created and combined with the message "COMPLETION OF BROADCAST" into a message 610a, by the reproduction controlling unit 160. Also, a "RETURN" button 610b and a "TRY STORAGE AGAIN" button 610c are graphics images created by the reproduction controlling unit 160.

From this display, the user can find out the fact and reason that the news program on the channel CH1 is not stored in the module storing unit 130. By pressing the "RETURN" button 610b, the user can return to the data broadcast menu in FIG. 13. Also, by pressing the "TRY STORAGE AGAIN" button 610c, the user can try to store the data module (ID number 100) again. When the user presses the "TRY STORAGE AGAIN" button 610c, the reproduction controlling unit 160 receives the user indication and notifies it to the storage controlling unit 120. The reacquiring unit 126 in the storage controlling unit 120 accordingly reacquires the indicated data module from the server via the telephone network 30.

FIG. 15 shows an example display (weather channel top menu) when the user pressed the "CH2 WEATHER" button 601b on the display in FIG. 13, in the case where the notification mode for incomplete selection buttons is pre-display. Here, the user-selected data module (ID number 200) includes 9 selection buttons (from "HOKKAIDO" to "KYUSHU"), among which "HOKKAIDO", "TOHOKU", and "KANTO" are incomplete selection buttons.

This display is produced as follows. On receiving the user selection of the button 601b on the display in FIG. 13, the reproduction controlling unit 160 refers to the link information included in the data module (ID number 0), and detects an ID number (200) or name (CH2_MN) of a data module that is the link destination of the button 601b. The reproduction controlling unit 160 then searches the storage information storing unit 140 for storage information of the data module using the detected ID or name, and finds that the data module (ID number 200) is stored in the module storing unit 130. The reproduction controlling unit 160 accordingly reads the data module (ID number 200) from the module storing unit 130, and refers to link information in the data module (ID number 200) (see FIG. 10) to specify its secondary data modules (such as ID numbers 221 and 222). The reproduction controlling unit 160 then refers to the storage information storing unit 140 to judge whether these secondary data modules are-stored in the module storing unit 130, and sorts selection buttons corresponding to the secondary data modules into complete selection buttons and incomplete selection buttons. The reproduction controlling unit 160 also reads the notification mode from the notification mode storing unit 164.

Since the notification mode is pre-display in this example, the reproduction controlling unit 160 produces an image of the data module (ID number 200) in which the complete selection buttons (e.g. the "KINKI" button) are displayed in designated color while the incomplete selection buttons (e.g. the "KANTO" button) are displayed in designated color but with lower brightness.

From this display, the user can know that the detailed weather forecast for the Hokkaido, Tohoku, and Kanto regions will not be displayed in complete form.

Figure 16:
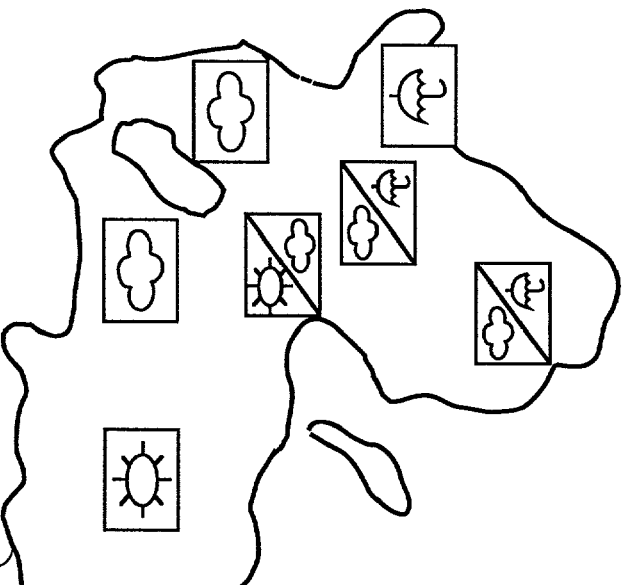
FIG. 16 shows an example display (Kinki weather forecast) when the user pressed a "KINKI" button on the display shown in FIG. 15.

FIG. 16 shows an example display (weather forecast for the Kinki region) when the user pressed the "KINKI" button on the display shown in FIG. 15, which corresponds to a data module (ID number 210) shown in FIG. 10.

This data module (ID number 210) includes complete sets of resource information for showing detailed weather forecast for the Kinki region, such as a set of resource information for displaying a weather table 621a in text and a set of resource information for displaying a weather map 621b in image.

FIG. 17 shows an example display (weather forecast for the Kanto region) when the user pressed the "KANTO" button on the display shown in FIG. 15, which corresponds to a data module (ID number 220) shown in FIG. 10.

This display lacks an image of a weather map (on the left side), unlike the display shown in FIG. 16. This is consistent with the display in FIG. 15 where the "KANTO" button is displayed in light color.

To be more specific, the reproduction controlling unit 160 refers to storage information of the data module (ID number 220) in the storage information storing unit 140, and judges that the data module is stored in the module storing unit 130 but one or more sets of resource information in the data module (ID number 220) are missing. The reproduction controlling unit 160 reads a problem ID and a solution ID from the storage information of the data module (ID number 220), and reads a problem message and solution message corresponding to the read problem ID and solution ID from the problem/solution table storing unit 162. The reproduction controlling unit 160 then displays these messages on the TV 40, together with the stored sets of resource information.

Thus, even when a display object in part of a screen display is missing, a message that explains why the display object is missing and a message that suggests a solution to the problem are displayed instead of the missing display object, which makes the display appear in its entirety.

Figure 18:
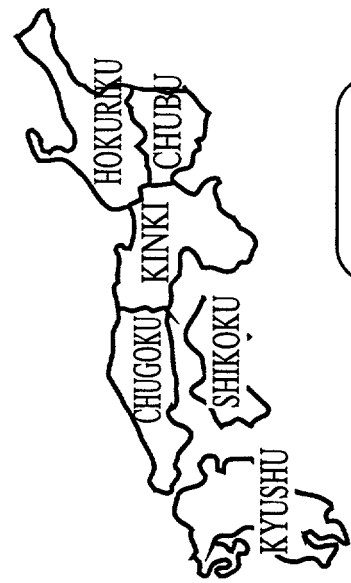
FIG. 18 shows an example display (weather channel top menu) corresponding to the display in FIG. 15, in the case where a notification mode for incomplete selection buttons is set at non-display.

FIG. 18 shows an example display (weather channel top menu) corresponding to the display shown in FIG. 15, in the case where the notification mode for incomplete selection buttons is non-display.

In this display, the three incomplete selection buttons "HOKKAIDO", "TOHOKU", and "KANTO" are not displayed. In other words, the reproduction controlling unit 160 reproduces and outputs the data module (ID number 220) while omitting the three incomplete selection buttons.

Displaying the weather menu in such a way can keep the user from selecting one of the incomplete selection buttons.

Figure 19:
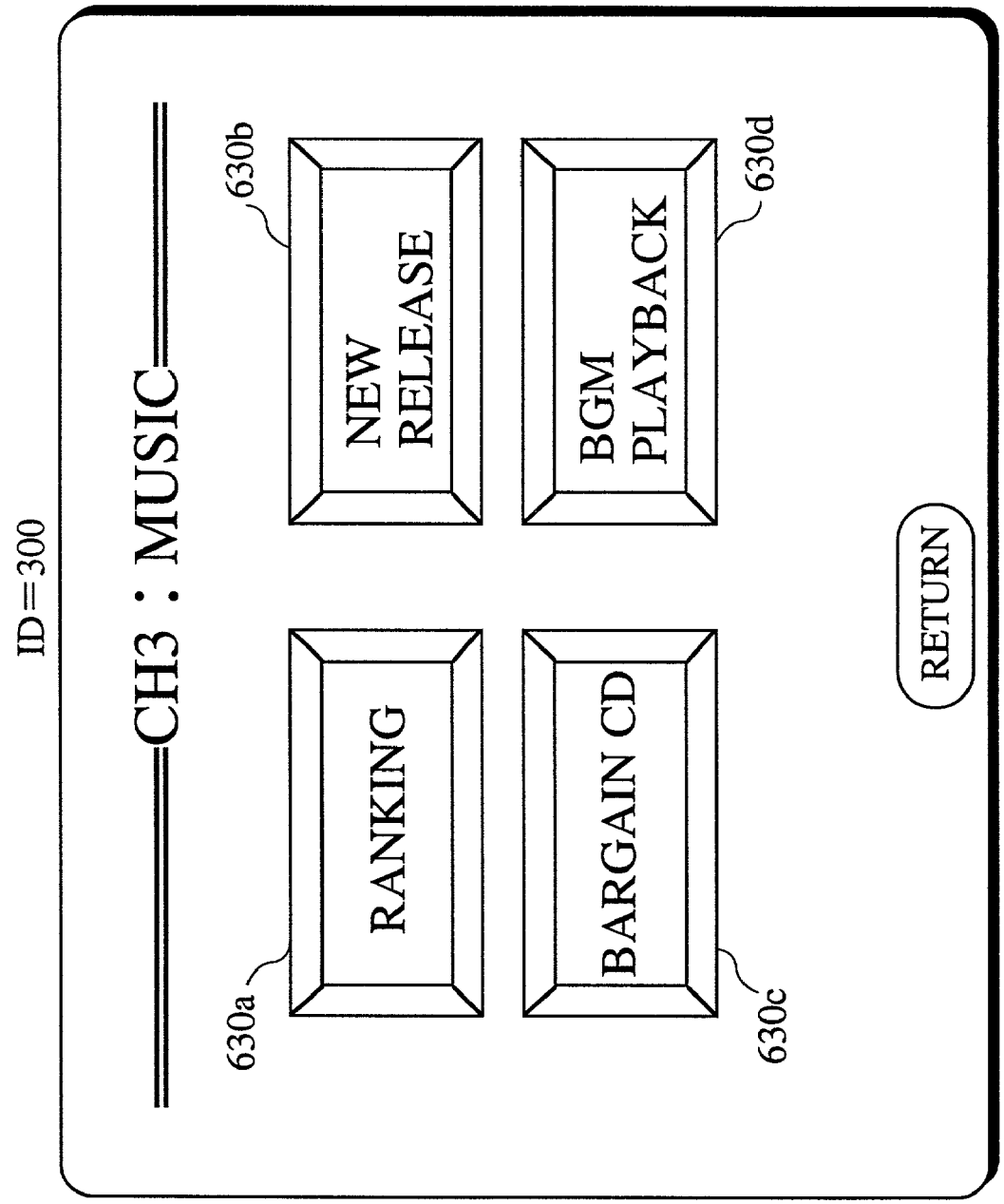
FIG. 19 shows an example display (music channel top menu) when the user pressed a "CH3 MUSIC" button on the display shown in FIG.13.

FIG. 19 shows an example display (music channel top menu) when the user pressed the "CH3 MUSIC" button 601c on the display shown in FIG. 13, in the case where the notification mode for incomplete selection buttons is normal display. Though this display contains four selection buttons 630a–630d, it is impossible for the user to know whether these selection buttons are complete selection buttons or not.

FIG. 20 shows an example display when the user pressed the "BARGAIN CD" button 630c on the display shown in FIG. 19. Here, a problem message corresponding to the problem ID "3" and a solution message corresponding to the solution ID "2" are displayed. A "STORE LATER VERSION" button 631a is a graphics image produced by the reproduction controlling unit 160.

In this example, a data module (ID number 330) that corresponds to the "BARGAIN CD" display was stored in the module storing unit 130 in the past (e.g. until Jan. 10, 2000), but was automatically deleted by the garbage collecting unit 122 at its expiration (midnight on Jan. 11, 2000). Therefore, if the user presses the "BARGAIN CD" button 630c in FIG. 19 on Jan. 12, 2000, a message 631 is displayed as shown in FIG. 20. After reading this message, the user can return to the music menu in FIG. 19, by controlling the arrow keys on the remote control 22.

Also, the user can try to store a later version of the data module (ID number 330), by pressing the "STORE LATER VERSION" button 631a. More specifically, when the user presses this button, the reproduction controlling unit 160 receives the user indication and notifies it to the storage controlling unit 120. The storage controlling unit 120 accordingly refers to storage information of the data module (ID number 330) in the storage information storing unit 140, and reads a version number. The storage controlling unit 120 then acquires a later version of the data module (ID number 330) from the receiving unit 110.

FIG. 21 shows an example display when the user pressed the "BGM PLAYBACK" button 630d on the display shown in FIG. 19. Here, a problem message corresponding to the problem ID "4" and a solution message corresponding to the solution ID "3" are displayed.

In this example, a data module (ID number 340) corresponding to the "BGM PLAYBACK" display is chargeable, but the license information storing unit 124 does not store license information which authenticates that the user has signed up for the data module (ID number 340).

From a message 632*a* in FIG. 21, the user can know that content of "BGM PLAYBACK" is not free, and that he/she has not signed up for the content. After reading this message, the user can return to the music menu in FIG. 19 by pressing a "RETURN" button 632*b*. Also, the user can acquire license information (an authentication password), by pressing an "ACQUIRE LICENSE INFORMATION" button 632*c*. More specifically, when the user presses this button, the reproduction controlling unit 160 receives the user indication and notifies it to the storage controlling unit 120. The license information acquiring unit 125 in the storage controlling unit 120 accordingly acquires license information for the data module (ID number 340) via the telephone network 30. This allows the user to enjoy the content of "BGM PLAYBACK".

Although the present invention has been described based on the above embodiment, the invention should not be limited to such. For example, the following modifications are applicable.

The above embodiment describes the case where incomplete selection buttons are displayed in light color. However, instead of or in addition to such a display, a list of information (module name or ID) about data modules which are not stored in the module storing unit 130 may be displayed. This allows the user to know in advance which options among a plurality of options presented on the menu display are available in complete form.

The above embodiment describes the case where the garbage collecting unit 122 automatically performs the expiration check and the expired data module deletion at midnight every day. However, such expiration check and expired data module deletion may be performed at regular time intervals, or may be performed as scheduled by the user. Also, they may be performed when the amount of data stored in the module storing unit 130 exceeds a predetermined value or when the data broadcast receiving apparatus 20 is powered on.

Another example of handling expired data modules is given below. When the user indicates reproduction of some data module, the reproduction controlling unit 160 judges whether the data module expired. If the data module expired, the reproduction controlling unit 160 asks the permission of the user to delete the data module, and deletes the data module from the module storing unit 130 only when the user's permission is gained. In so doing, the user can retain desired content freely, regardless of the expiry date of the content.

The above embodiment describes the case where a problem message is displayed in image when a user-selected data module or part of it (i.e. one or more sets of resource information) is missing, but such a message may be outputted in voice.

The above embodiment describes the case where the invention is used for an apparatus that receives TV broadcasts via satellite, though this is not a limit for the invention, which may be widely used in an apparatus for receiving wire broadcasts or VOD (video on demand) broadcasts, an apparatus for receiving electronic broadcast content via the Internet, such as a receiver equipped in a personal computer or a portable receiver equipped with a liquid crystal screen.

Furthermore, a computer-readable program that realizes the above embodied data broadcast receiving method can be distributed via a recording medium such as a CD-ROM or a transmission medium such as a communications network.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A data broadcast receiving apparatus for receiving broadcast data that includes a plurality of data modules which are linked by link information, comprising:
   module storing means for storing data modules included in the received broadcast data;
   storage information storing means for storing storage information corresponding to each of the plurality of data modules of the broadcast data, the storage information showing a storage state of the data module;
   storage controlling means for, for each of the plurality of data modules of the broadcast data, (i) attempting to store the data module into the module storing means, (ii) if the storage of the data module has succeeded generating storage information showing a correspondence between the data module and a storage state of the data module, and storing the generated storage information into the storage information storing means, and (iii) if the storage of the data module has failed, generating storage information showing a correspondence between the data module, a storage state of the data module and a problem because of which the data module is not stored, and storing the generated storage information into the storage information storing means;
   user indication accepting means for accepting an indication from a user; and
   reproducing means for
   (a) judging whether a target data module which is specified in accordance with the user indication and the link information is stored in the module storing means, based on storage information of the target data module in the storage information storing means,
   (b) when the target data module is stored in the module storing means, reading the target data module from the module storing means, and reproducing and outputting the read target data module, and
   (c) when the target data module is not stored in the module storing means, outputting first information for informing the user that the target data module is not stored and second information for informing the user of a problem because of which the target data module is not stored.

2. The data broadcast receiving apparatus of claim 1, wherein the reproducing means includes:
   a judging unit for judging whether the target data module is stored in the module storing means, based on the storage information of the target data module in the storage information storing means; and
   an informing unit for outputting the first information and the second information when the target data module is not stored in the module storing means.

3. The data broadcast receiving apparatus of claim 2, wherein the informing unit outputs third information for suggesting a solution for the problem to the user, together with the first information and the second information.

4. The data broadcast receiving apparatus of claim 3, further comprising:
   user instruction accepting means for accepting an instruction from the user to implement the solution; and solution implementing means for implementing the solution in accordance with the user instruction accepted by the user instruction accepting means.

5. The data broadcast receiving apparatus of claim 2, wherein each of the plurality of data modules is made up of at least one set of resource information, if the storage of the data module has succeeded, the storage controlling means generates storage information showing a correspondence between the data module and a storage state indicating that all sets of resource information that make up the data module are stored, if the storage of the data module has failed, the storage controlling means generates, (a) if none of the sets of resource information of the data module is stored, storage information showing a correspondence between the data module, a storage state indicating that none of the sets of resource information is stored, and a problem because of which none of the sets of resource information is stored, and (b) if a part of the sets of resource information of the data module is not stored, storage information showing a correspondence between the data module, a storage state indicating that the part of the sets of resource information is not stored, and a problem because of which the part of the sets of resource information is not stored, the judging unit judges whether all sets of resource information that make up the target data module are stored in the module storing means, a part of the sets of resource information of the target data module is not stored in the module storing means, or none of the sets of resource information of the target data module is stored in the module storing means, based on the storage information of the target data module in the storage information storing means, when the judging unit judges that all of the sets of resource information of the target data module are stored in the module storing means, the reproducing means reads all of the sets of resource information of the target data module from the module storing means, and reproduces and outputs the read sets of resource information, when the judging unit judges that the part of the sets of resource information of the target data module is not stored in the module storing means, the reproducing means reads the other sets of resource information of the target data module from the module storing means and reproduces and outputs the read sets of resource information, and the informing unit outputs the first information for informing the user that the part of the sets of resource information is not stored, and the second information for informing the user of the problem because of which the part of the sets of resource information is not stored, and when the judging unit judges that none of the sets of resource information of the target data module is stored in the module storing means the informing unit outputs the first information for informing the user that none of the sets of resource information is stored, and the second information for informing the user of the problem because of which none of the sets of resource information of the target data module is stored.

6. The data broadcast receiving apparatus of claim 1, wherein the reproducing means specifies, prior to the reproduction of the target data module, data modules which are link destinations of the target data module and therefore may be indicated by the user as the next target data module, with reference to the link information, judges whether the link destination data modules of the target data module are all stored in the module storing means based on storage information of the link destination data modules in the storage information storing means, and when any of the link destination data modules of the target data module is not stored in the module storing means, informs the user that the link destination data module is not stored.

7. The data broadcast receiving apparatus of claim 6, wherein the reproducing means includes:

a judging unit for specifying the link destination data modules of the target data module with reference to the link information, and judging whether the link destination data modules are all stored in the module storing means based on the storage information of the link destination data modules in the storage information storing means; and an informing unit for informing, when any of the link destination data modules is not stored in the module storing means, the user that the link destination data module is not stored.

8. The data broadcast receiving apparatus of claim 7, wherein the target data module includes display objects corresponding to the link destination data modules, and the informing unit informs the user that the link destination data module is not stored, by displaying a display object corresponding to the link destination data module which is not stored, in a different manner from the other display objects corresponding to link destination data modules which are stored.

9. The data broadcast receiving apparatus of claim 7, wherein the target data module includes display objects corresponding to the link destination data modules, and the informing unit informs the user that the link destination data module is not stored, by not displaying a display object corresponding to the link destination data module which is not stored.

10. The data broadcast receiving apparatus of claim 7, wherein the target data module includes display objects corresponding to the link destination data modules, and the informing unit informs the user that the link destination data module is not stored, by flashing a display object corresponding to the link destination data module which is not stored, on and off.

11. The data broadcast receiving apparatus of claim 7, wherein the informing unit informs the user that the link destination data module is not stored, by means of voice output.

12. A data broadcast receiving method for use in an apparatus for receiving broadcast data that includes a plurality of data modules which are linked by link information, the apparatus including a module storing unit and a storage information storing unit, the data broadcast receiving method comprising:

a storage controlling step for, for each of the plurality of data modules of the broadcast data, (i) attempting to store the data module into the module storing unit, and (ii) if the storage of the data module has succeeded, generating storage information showing a correspondence between the data module and a storage state of the data module, and storing the generated storage information into the storage information storing unit, and (iii) if the storage of the data module has failed, generating storage information showing a correspondence between the data module, a storage state of the data module and a problem because of which the data module is not stored, and storing the generated storage information into the storage information storing unit;

a user indication accepting step for accepting an indication from a user; and a reproducing step for (a) judging whether a target data module which is specified in accordance with the user indication and the link information is stored in the module storage unit, based on storage information of the target data module in the storage information storing unit, (b) when the target data module is stored in the module storage unit, reading the target data module from the module storage unit, and reproducing and outputting the read target data module, and (c) when the target data module is not stored in the module storage unit, outputting first information for informing the user that the target data module is not stored and second information for informing the user of a problem because of which the target data module is not stored.

13. A computer program for use in an apparatus for receiving broadcast data that includes a plurality of data modules which are linked by link information, the apparatus including a module storing unit and a storage information storing unit, the computer program comprising:

a storage controlling step for, for each of the plurality of data modules of the broadcast data, (i) attempting to store the data module into the module storing unit, (ii) if the storage of the data module has succeeded, generating storage information showing a correspondence between the data module and a storage state of the data module, and storing the generated storage information into the storage information storing unit, and (iii) if the storage of the data module has failed, generating storage information showing a correspondence between the data module, a storage state of the data module, and a problem because of which the data module is not stored, and storing the generated storage information into the storage information storing unit;

a user indication accepting step for accepting an indication from a user; and a reproducing step for (a) judging whether a target data module which is specified in accordance with the user indication and the link information is stored in the module storage unit, based on storage information of the target data module in the storage information storing unit, (b) when the target data module is stored in the module storage unit, reading the target data module from the module storage unit, and reproducing and outputting the read target data module, and (c) when the target data module is not stored in the module storage unit, outputting first information for informing the user that the target data module is not stored and second information for informing the user of a problem because of which the target data module is not stored.

14. A computer-readable recording medium recording a computer program for use in an apparatus for receiving broadcast data that includes a plurality of data modules which are linked by link information, the apparatus including a module storing unit and a storage information storing unit, the computer program comprising:

a storage controlling step for, for each of the plurality of data modules of the broadcast data, (i) attempting to store the data module into the module storing unit, (ii) if the storage of the data module has succeeded, generating storage information showing a correspondence between the data module and a storage state of the data module, and storing the generated storage information into the storage information storing unit, and (iii) if the storage of the data module has failed, generating storage information showing a correspondence between the data module, a storage state of the data module, and a problem because of which the data module is not stored, and storing the generated storage information into the storage information storing unit;

a user indication accepting step for accepting an indication from a user; and a reproducing step for (a) judging whether a target data module which is specified in accordance with the user indication and the link information is stored in the module storage unit, based on storage information of the target data module in the storage information storing unit, (b) when the target data module is stored in the module storage unit, reading the target data module from the module storage unit, and reproducing and outputting the read target data module, and (c) when the target data module is not stored in the module storage unit, outputting first information for informing the user that the target data module is not stored and second information for informing the user of a problem because of which the target data module is not stored.

* * * * *